TRANSFORMER MOUNTING CLIP AND ASSEMBLY

Filed Sept. 26, 1961 2 Sheets-Sheet 1

INVENTOR.
Henry A. Blyth
BY
Robert D. Silver
ATT'Y.

May 26, 1964 H. A. BLYTH 3,134,467

TRANSFORMER MOUNTING CLIP AND ASSEMBLY

Filed Sept. 26, 1961 2 Sheets-Sheet 2

INVENTOR.
Henry A. Blyth
BY
Robert D. Silver
ATT'Y.

United States Patent Office 3,134,467
Patented May 26, 1964

3,134,467

TRANSFORMER MOUNTING CLIP AND ASSEMBLY

Henry A. Blyth, Des Plaines, Ill., assignor to Illinois Tool Works Inc., Chicago, Ill., a corporation of Delaware Filed Sept. 26, 1961, Ser. No. 140,893
13 Claims. (Cl. 189—35)

This invention relates in general to a transformer mounting clip per se and also relates to a transformer, a transformer mounting clip, and an apertured panel in assembled relation.

There are many electrical assemblies such as electrical appliances, radios, television sets, amplifiers, control consoles, and the like, which utilize a transformer. Most of these appliances utilize a metal chassis for mounting the various components and electrical subassemblies associated therewith and the mounting of the transformer on this chassis has heretofore posed a problem. The transformers are relatively heavy units and conventionally comprise central laminations and a pair of opposed cup shaped covers which protect the windings in the mid portion of the laminations. Bolts are conventionally fitted through the four corners of the laminations through the lips of the top and bottom cover portions to hold the transformer assembly together, said bolts then being used with aligned bolt apertures in a panel. Conventionally the panel is provided with a large cut-out transformer aperture to receive lower portion of the transformer, said large aperture in the panel being smaller than the mouth or lip portion of the transformer cover and larger than the mid portion thereof so that a majority of the transformer will project above one side of the panel. Conventional nuts are then threaded to the extending bolts after insertion into the aligned bolt apertures so as to mount the transformer onto the panel. This conventional method of mounting or disassembly as above outlined is cumbersome and time consuming. Further, a difficult problem is often encountered when it is desired to mount a transformer immediately adjacent to a right angle bend in the panel, since there is very little room to get in to hold a nut and attach same to the extending bolt. Also, by nature of the assembly, no air space is left between the mouth or lip of the cover and the panel itself so as to allow good circulation of air around the bottom portion of the transformer that is disposed within the aperture for cooling effects.

It is a general object of this invention to provide a novel clip means which greatly reduces the handling time in assembly and disassembly of transformers to apertured panels.

It is a further object of this invention to provide a transformer panel and clip assembly which provides stable mounting, affords mounting of the transformer close to a right angle bend in the panel, and in certain forms, the clip and the transformer may be preassembled such that merely an axial pushing on the assembled clip and transformer may accomplish the mounting of the transformer in a panel aperture.

A still further object of this invention is to provide an assembly wherein the dimensional tolerances of the associated parts is greatly increased, thereby reducing cost in the total assembly.

Another object of this invention is to provide a clip means which may be utilized with a single prepunched transformer aperture in the mounting panel, there not being required any separate fastener apertures.

A further object of this invention is to provide a transformer and clip assembly which may be installed in an apertured panel from one side only, or stated in another way, the transformer may be inserted into a so-called blind aperture.

Another object of this invention is to provide a panel clip mounting member for a transformer which mounts the transformer in a stable resilient fashion which prevents disassembly when the assembly is subjected to vibration.

A further and more specific object of this invention is to provide, in certain forms, a means of mounting a transformer to a panel in a quick detachable manner where this is stability against shifting of the transformer relative to the panel by aggressive opposed ends of spring tongue members which bite into the panel to provide a stable assembly.

A still further object of this invention is to provide a mounting of a transformer in an apertured panel in a manner that provides a good free passage air flow around the mounted transformer without sacrifices of the hereinbefore noted advantages.

A still more specific object of this invention is to provide a mounting clip means which is attachable to a transformer which is formed with an integral extending member which in turn is formed with an intermediate latching tongue portion, said integral extending member engaging the transformer at two spaced points to provide stability in mounting as well as to space the transformer from the margins of the panel aperture immediately surrounding the transformer.

The novel features that are characteristic in the invention are set forth with particularity in the appended claims. The invention itself, however, both as to its organization and method of operation together with additional objects and advantages thereof will be best understood by the following description of specific embodiments when read in connection with the accompanying drawings in which:

Figures 1, 1A, 2, 3, 4, 5, 6, 7:
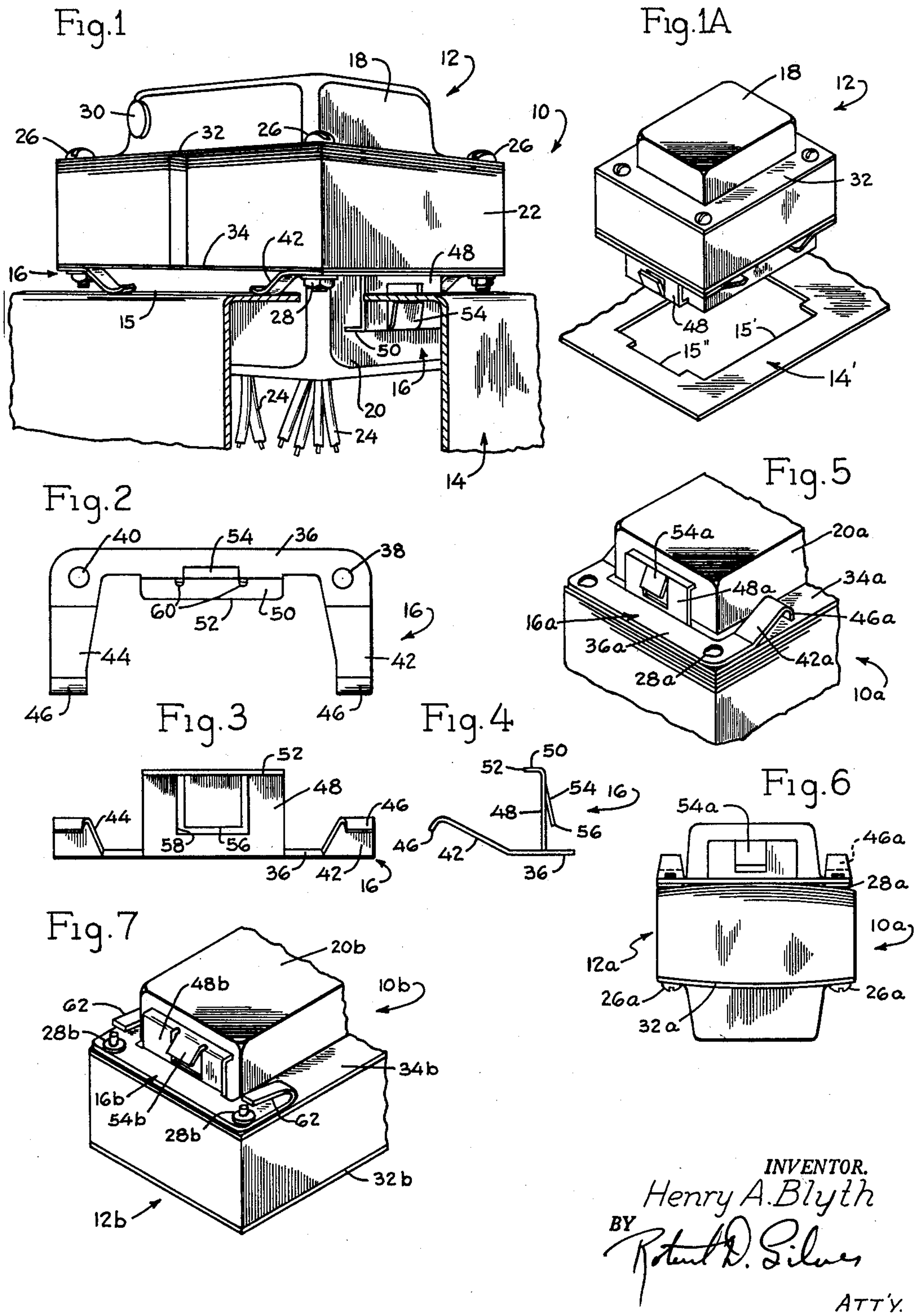
FIG. 1 is an isometric perspective view, partially in section, showing the assembly of a transformer and a panel utilizing a clip means embodying my novel concepts.
FIG. 1A is a semidiagrammatic perspective view of the components shown in FIG. 1, there being a modified form of panel aperture for receipt of the transformer with the pre-assembled clip thereon.
FIG. 2 is a top plan view of the clip used in the assemblies shown in FIGS. 1 and 1A.
FIG. 3 is a front elevational view of the clip shown in FIG. 2.
FIG. 4 is a side view of the clip shown in FIGS. 2 and 3.
FIG. 5 is a partial perspective view of a modified form of clip shown mounted on a portion of a transformer.
FIG. 6 is a front elevational view of the assembly shown in FIG. 5, said view of the assembly being distorted for purposes of illustration.
FIG. 7 is a partial perspective view illustrating another modified form of clip and transformer in preassembled relation.

As shown in FIG. 1, the assembly 10 comprises a transformer means 12, panel means 14, and clip means 16 which joins the transformer to the aperture 15 in the panel.

The transformer means 12 generally comprises an upper cup-shaped cover 18 and a lower opposed cup-shaped cover 20 which are disposed on opposite sides of central laminations 22. The covers 18 and 20 protect the transformer windings and there are suitable apertures in the bottom cover 20 so that the ends 24 of the windings may be attached to various electrical connectors as suitable and desired. The transformer is held in assembled relationship by suitable fastening means such as bolts 26 and nuts 28 which traverse apertures placed in the four corners of the wide mouths 32 and 34 of the respective covers 18 and 20. An overload button control means 30 is disposed in the upper cover 18 in accordance with usual practice. The covers 18 and 20 are generally cup-shaped in appearance and may be made from sheet material, for example, drawn steel. The mouths of the covers 18 and 20 extend to the edge of the laminations 22 and have a generally rectilinear appearance in top view. It is, of course, understood that the laminations 22 are the conventional transformer laminations separated by suitable insulation means in accordance with usual practice.

The panel means 14 is here shown in the form of a sheet metal chassis formed with a transformer aperture 15 which is slightly larger than the upwardly and downwardly extending portions of the transformer covers 18 and 20 but is smaller than the horizontal extent of the mouths or lips 32—34 of the covers. The aperture 15 may be rectilinear in nature or may be of the type shown in FIG. 1A wherein the aperture 15′ has a cut out 15″ at each end thereof for cooperation with a portion of the clip means 16 as shall now be described.

The clip means 16 generally comprises a sheet metal member having a central base portion 36 which is adapted to be co-extensive with the end portion of the mouth portion 34 of the lower cup-shaped cover 20. Through apertures 38 and 40 are placed in the base portion 36 at opposite ends thereof for co-operation with the fastening means 26 for the transformer means 12. As best shown in FIG. 2, the clip means 16 is somewhat U-shaped in plan view, the base portion 36 being the base of the U with a pair of parallel extending arms 42 and 44 which are offset from the plane of the base. The ends of the arms 42 and 44 are reversely bent to provide end portions 46 and the sheet material of which the clip means 16 is formed is sufficiently springy so that the arms are resilient in nature. As shown in FIGS. 3 and 4, an integral upstanding central portion 48 has the top thereof angularly offset to provide a portion 50 which is substantially parallel with base portion 36 and to define an inwardly located end surface 52. A spring tang 54 is predisposed outwardly from portion 48 and has an end surface 56. Tang 54 is cut out from portion 48 leaving an aperture 58 and small curvilinear apertures 60 in top portion 50. The little fillets or cut outs 60 in top portion 50 prevent failure of the tang 54 upon flexure thereof particularly along the juncture of upstanding portion 48 and angularly disposed top portion 50. As perhaps can best be seen in FIGS. 3 and 4, the furthest upwardly extent of arms 42 and 44 is normally (unflexed state) above the furthest downwardly extent of end surface 56 of tang 54 but below the height of top portion 50.

When the clip means 16 is assembled to the transformer by fastening means 26 and then to the panel 14 as shown in FIG. 1, it will be appreciated that it is in upside down position from that shown in FIGS. 3 and 4. End surface 56 of tang 54 engages the underside of the panel 14 and the two arms 42 and 44 engage the upper-side of the panel and impart a resilient bias for locking co-operation of the transformer to the panel. End surface 52 is disposed adjacent to and engages the side of the bottom cover 20 and maintains a spacing between the transformer cover and the margin of the aperture 15 in the panel. Portion 50 serves to strengthen the clip means and gives a spaced support to the transformer for stability of mounting. After a pair of clip means 16 have been assembled to the two ends of the transformer means 12, the assembly of the transformer to the panel 14 is easily accomplished by merely an axial movement causing flexure of the tang 54 which snaps into place underneath the panel. Due to the resilience of the spring arms 42 and 44, the assembly is quite stable when subjected to vibration. As can be perceived from FIG. 1, a good circulation of air can move from the underside of the panel to the upperside thereof due to the nature of the clip assembly.

To impart greater lateral stability in mounting, the aperture 15 may be modified as shown in FIG. 1A by having an additional cut-out 15″ which is made the same size as the width of portion 48 of the clip means 16. Since the apertures in the panel 14′ are produced by a simple punch press operation the addition of the slight cut-out 15″ is provided at very small additional cost. Air may still circulate through aperture 58 in the clip means.

The clip means 16*a* assembled to a transformer shown in FIG. 5 is substantially similar to that hereinbefore described and similar parts shall be identified with similar reference numerals with the addition of the suffix *a*. The clip means 16*a* shown in FIG. 5 is modified in two respects relative to clip 16. The ends 46*a* of the arms 42*a* and 44*a* are elongated to an extent and the end surfaces thereof are parallel with the base portion 36*a* of the clip. Due to the elongation of the ends 46*a* and the disposition thereof they will engage surface 34*a* of the mouth of the cover 20*a* upon extreme flexure and due to the extra supports supplied by the ends, they will not be as subject to collapse.

The clip means 16*a* also has the holes 38 and 40 modified to form helical screw impressions 28*a* which eliminates the necessity of a separate nut 28 as shown in FIG. 1.

It will be noted that the helical screw impressions 28*a* of FIG. 5 are formed in the clip so that the helical deformations are on the underside of the clip as viewed in FIGS. 5 and 6. This is the preferred construction so that the impressions 28*a* will compensate for the slight end squeezing effect that occurs from tightening the bolts 26*a*. Thus the clip 16*a* is maintained parallel with the panel surfaces even though the corners of the lamination and the corners of the cover mouths are slightly distorted which is shown in exaggerated fashion in FIG. 6. In all other respects, the clip means and assembly is similar to that shown in FIG. 1.

The transformer means 12*b* shown in FIG. 7 and the clip means 16*b* attached thereto is similar in most respects to that aforediscussed and similar parts will be identified with similar reference numbers with the addition of the suffix *b*. In the clip means 16*b*, the arms 42*b* and 44*b* are bent reversely from that of the clip 16. Thus the ends 62 of the arms are disposed more closely adjacent to the line of action of the spring tang 54*b*. It will be appreciated that this form requires a slightly greater amount of material to provide a reversely bent spring arm.

Figure 8:
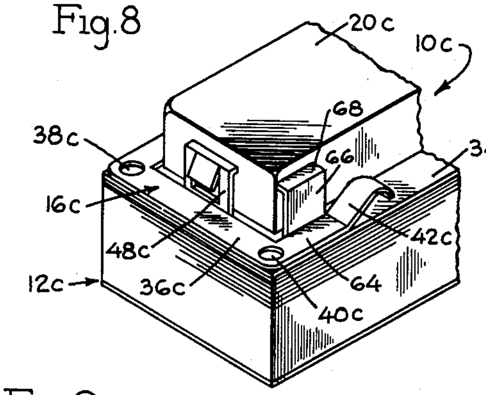
FIG. 8 is a partial perspective view showing still another modified form of clip and transformer assembly.
Figure 8A:
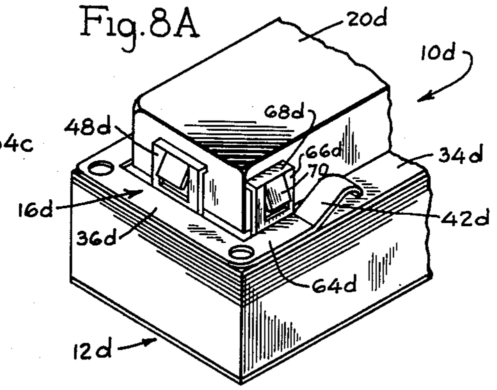
FIG. 8A is a view of still another form of a modified clip and transformer assembly similar in many respects to FIG. 8.

The transformer means 12*c* and 12*d* shown in FIGS. 8 and 8A are substantially similar to those aforediscussed and similar parts will be identified by similar reference numerals with the addition of the suffixes (*c*) and (*d*) respectively. The means 16*c* and 16*d* are modified forms of the previous clips and each are formed with additional upstanding members on the inboard edges of short arm extensions 64 which are coplanar with base portion 36*a*. More particularly a pair of oppositely disposed upstanding portions 66 are formed with offset end surfaces 68 and are attached to short extensions 64 which are located adjacent to the arm portions **42*c* and 44*c*. The extensions 66 are substantially identical to extension or upright 48*c* except in FIG. 8 there is no tang whereas the clip means 16*d* in FIG. 8A has tang means 70 struck out of upright portion 66*d*. Both of the clips shown assembled in FIGS. 8 and 8A will impart greater lateral stability, the clip of FIG. 8A being more advantageous due to the opposed biasing points of the tangs struck out of the upright portions 66*d***.

Figures 9, 10, 11, 12, 13:
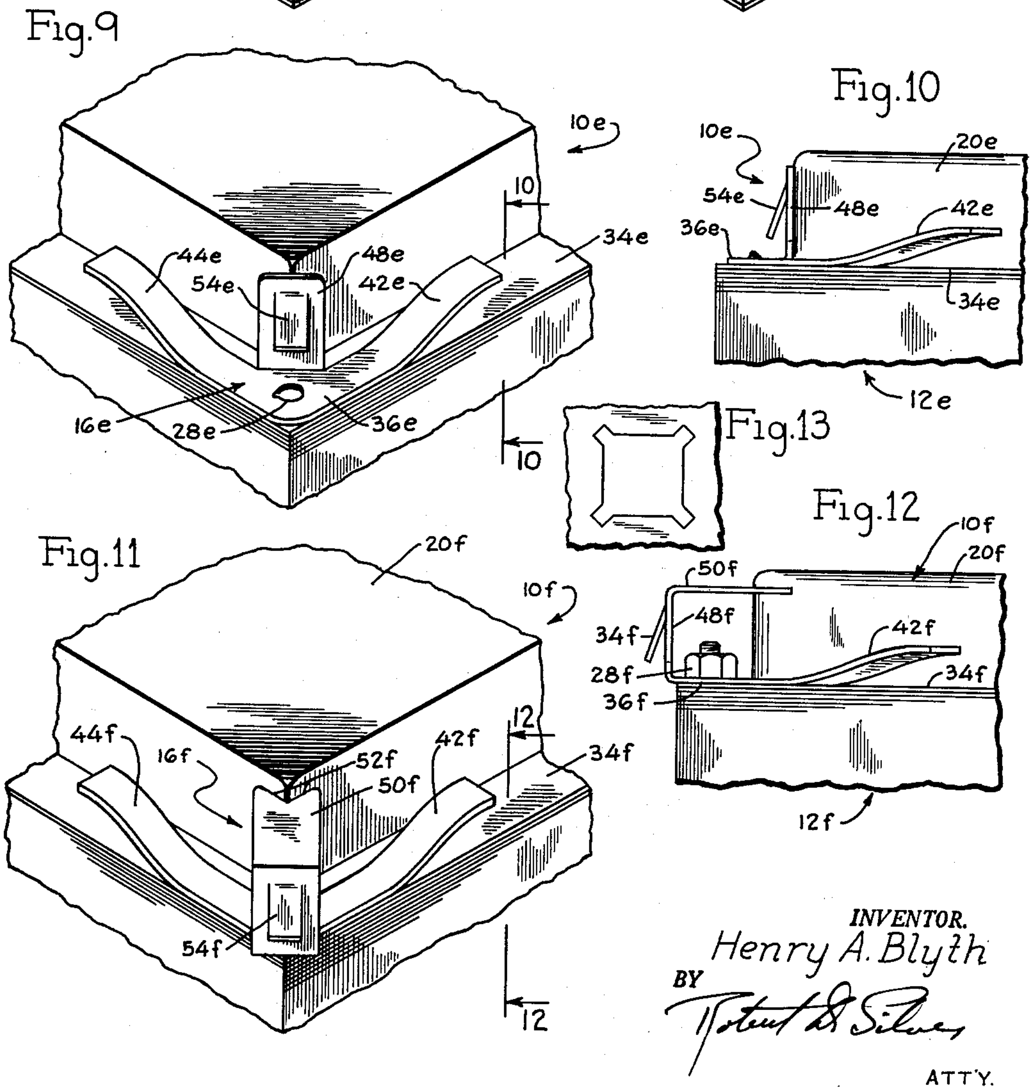
FIG. 9 is a view similar to FIGS. 7 through 8A showing still another form of modified clip and transformer assembly.
FIG. 10 is an oblique side elevational view approximately along lines 10—10 of FIG. 9.
FIG. 11 is a partial perspective view of still another form of modified clip and transformer assembly.
FIG. 12 is an oblique side elevational view approximately along lines 12—12 of FIG. 11.
FIG. 13 is a plan view of the modified panel aperture used with the clip means shown in FIGS. 11 and 12.

A further modification is shown in FIGS. 9 and 10 and similar parts will be given similar reference numerals with the addition of the suffix *e*. The clip means **16*e*, as shown in FIGS. 9 and 10, is essentially a single corner clip, there being four such clips required in the assembly. The clip is essentially triangular in shape with the base portion 36*e* being disposed immediately at the corner of the cover 20 of the transformer and the arms 42*e* and 44*e* extend at generally right angles to each other in plan view. In the form shown, the upright portion 48*e* is disposed immediately adjacent to the corner of the cover, there being no equivalent to portion 50 of the clip means 16. However, air circulation is still permitted due to the construction of the clips since the sides of the upright portion 48*e* extend so as to engage the margins of the aperture 15 in the panel in a manner so as to maintain a spacing of the cover from the panel. The major advantage of this type of clip is that it provides greater stability in mounting the transformer, however, at the slight additional expense and handling time during the assembly of the clips to the transformer 12*e***.

The assembly shown in FIGS. 11 and 12 is substantially similar to that shown in FIGS. 9 and 10 and similar parts shall be identified with similar reference numerals with the addition of the suffix *f*. A portion **50*f* corresponding to portion 50 of the clip 16 is provided to maintain spacing of the upright portion 48*f* from the transformer cover. This clip necessitates a cut-out in the corner of the panel so as to accommodate the spacing of the upright portion 48*f* from the panel cover. A diagrammatic view of the aperture is shown in FIG. 13. In the other respects, the clip 16*f* resembles clip 16*e***.

Although specific embodiments of the invention have been shown and described, it is with full awareness that many modifications thereof are possible. The invention, therefore, is not to be restricted except insofar as is necessitated by the prior art by the spirit of the appended claims.

The invention is claimed as follows:

1. A clip for assembly of a transformer to an apertured panel comprising a sheet material member having a first portion adapted to be fixed to and in abutting relation with a portion of said transformer and parallel with a portion of said panel, an integral extending central portion extending a first predetermined distance from said first portion and adapted to be inserted in the aperture in said panel, tongue means located in said extending portion having a reversely extending panel engageable end surface spaced from said first portion a second predetermined distance less than said first predetermined distance, said extending portion having an end portion substantially coplanar with said first portion and adapted to be engageable with a portion of said transformer spaced said first distance from said first portion, and second and third spring arm portions integral with said first portion, located on opposite sides of said first portion, and offset from said first portion in the same direction as said central extending portion and engageable with the margins of said aperture on the side opposite to the engagement of said end of said tongue portion.

2. A clip for assembly of a transformer to an apertured panel comprising a sheet material member having a first portion adapted to be fixed to and in abutting relation with a portion of said transformer and parallel with a portion of said panel, an integral extending central portion extending a first predetermined distance from said first portion, tongue means located in said extending portion having a panel engageable end surface spaced from said first portion a second predetermined distance less than said first predetermined distance, an angularly offset transformer engageable end surface on said central portion spaced from said first portion greater distance than the panel engaging end surface of said tongue portion, and curvilinear second and third spring arm portions integral with said first portion, located on opposite sides of said first portion, and offset from said first portion both in the same direction as said central extending portion and in the direction of said offset transformer engageable end thereof, said second and third spring arm portions being engageable with the margins of said aperture on the side opposite to the engagement of said end of said tongue portion.

3. The clip set forth in claim 2 wherein said second and third spring arms initially extend from said first portion in the direction of said central extending portion a third distance greater than said second distance and less than said first distance.

4. An assembly comprising a transformer having a top cover portion, a bottom cover portion and a peripherally enlarged mid portion, each of said top and bottom cover portions having an enlarged mouth portion abutting said peripherally enlarged mid portion in face to face relation, and quick attachable clip means fixed to said enlarged mouth portion of one of said cover portions for attaching said transformer to panel means having an aperture larger than said one of said cover portions and smaller than the mouth thereof for receipt of at least a portion of said transformer therewithin, said clip means comprising a sheet material member having a first portion substantially in a plane parallel to said enlarged mouth portion and fixed thereto, an integral second portion extending a first predetermined distance from said first portion, tongue means located in said extending second portion having a panel engageable end surface spaced from said first portion a second predetermined distance less than said first predetermined distance, and third and fourth extending spring arm portions attached to said first clip portion and offset therefrom engageable with the margins of the panel aperture on the side opposite to the engagement of said end of said tongue portion.

5. The clip means set forth in claim 4 wherein said mouth portion of said one cover is generally rectilinear, said clip means being disposed adjacent to and coextensive with one side and partially coextensive with immediately adjacent second and third sides of the mouth of said cover.

6. An assembly comprising a transformer having a top cup shaped portion, a bottom cup shaped portion and a horizontally extending mid portion, each of said top and bottom cup shaped portions having a flaring mouth portion abutting said horizontally extending mid portion in face to face relation, panel means having an aperture larger than said bottom cup shaped portion and smaller than said flaring mouth for receipt of said transformer therewithin, and quick attachable clip means attached to said flaring mouth portion of said bottom cup shaped portion comprising a sheet material member having a first portion in a plane parallel to said flaring mouth portion of said bottom cup shaped portion, an integral first depending portion extending a first predetermined distance from said first portion, first reversely extending tongue means located in said depending portion having a panel engaging end surface for engaging a surface margin of said panel aperture, said end surface being spaced from said first portion a second predetermined distance less than said first predetermined distance, and second and third spring arm portions attached to said first portion and offset therefrom to engage a panel surface adjacent said panel aperture on the side opposite to the engagement of said end of said tongue portion.

7. The assembly set forth in claim 6 wherein said second and third spring arm portions are substantially parallel and extend in the same direction from said first portion.

8. The assembly set forth in claim 7 wherein the said second and third spring arm portions are curved back upon themselves.

9. The assembly set forth in claim 6 wherein said first portion is formed with helical screw impressions adjacent to the juncture of said second and third spring arm portions.

10. The assembly set forth in claim 6 wherein second and third depending portions extend downwardly in the same direction as said first depending portion and are formed in said clip means adjacent to said second and third spring arm portions.

11. The assembly set forth in claim 10 wherein said second and third depending portions are formed with tongue means disposed at right angles to said first tongue means.

12. The assembly set forth in claim 6 where said first and second spring arm portions are disposed at right angles to each other and there are four clip means associated with said transformer and panel.

13. A clip for assembly of a transformer to an apertured panel comprising a sheet material member having a first portion adapted to be fixed to a portion of said transformer and parellel with a portion of said panel, an extending central portion, tongue means located in said extending portion having a panel engageable end surface spaced from said first portion, second and third spring arm portions integral with said first portion, located on opposite sides of said first portion, and offset from said first portion in the same direction as said central extending portion and engageable with the margins of said aperture on the side opposite to the engagement of said end surface of said tongue portion, and means associated with said central portion offset from the major plane thereof engageable with said transformer to space said transformer from said panel when in assembled relationship to allow fluid flow for cooling said transformer.

References Cited in the file of this patent

UNITED STATES PATENTS 2,687,862. Crowther ............ Aug. 31, 1954

FOREIGN PATENTS 798,766 Great Britain ............ July 23, 1958